United States Patent [19]

Braun et al.

[11] Patent Number: 4,756,595
[45] Date of Patent: Jul. 12, 1988

[54] OPTICAL FIBER CONNECTOR FOR HIGH PRESSURE ENVIRONMENTS

[75] Inventors: Steve W. Braun; Richard M. Romley, both of San Diego, Calif.

[73] Assignee: Honeywell Inc., Minneapolis, Minn.

[21] Appl. No.: 854,224

[22] Filed: Apr. 21, 1986

[51] Int. Cl.⁴ ............................................. G02B 6/36
[52] U.S. Cl. .............................. 350/96.21; 350/96.10; 350/96.20
[58] Field of Search ................ 350/96.20, 96.21, 96.23

[56] References Cited

U.S. PATENT DOCUMENTS

| | | | |
|---|---|---|---|
| 4,212,514 | 7/1980 | Prunier et al. | 350/96.21 |
| 4,411,491 | 10/1983 | Larkin et al. | 350/96.20 X |
| 4,448,478 | 5/1984 | Matthews et al. | 350/96.21 |
| 4,479,702 | 10/1984 | Pryor et al. | 350/96.20 |
| 4,537,468 | 8/1985 | Degoix et al. | 350/96.21 |
| 4,573,253 | 3/1986 | Smith et al. | 350/96.23 X |
| 4,579,420 | 4/1986 | Winter et al. | 350/96.23 |
| 4,594,766 | 5/1986 | Smith, Jr. et al. | 350/96.23 X |

Primary Examiner—William L. Sikes
Assistant Examiner—Akm E. Ullah
Attorney, Agent, or Firm—William T. Udseth

[57] ABSTRACT

A pressure compensated, fiber optic coupler for use underwater includes a water impermeable housing have first and second apertures to receive the respective optical fibers. One fiber is permanently held by the seal to the first aperture. The other fiber is inserted through the second aperture which is sealed by a conformable seal which is biased closed when no fiber is inserted through it. An incompressible, refraction of index matched fluid fills the interior of the housing to provide pressure compensation. The conformable seal is conveniently constructed of flexible neoprene and the housing is preferably titanium.

10 Claims, 4 Drawing Sheets

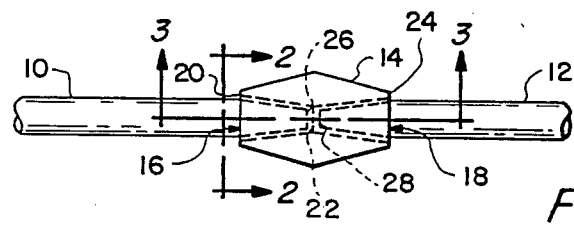
Fig. 1
PRIOR ART
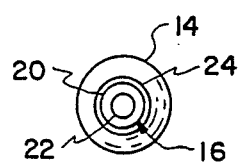
Fig. 2
PRIOR ART
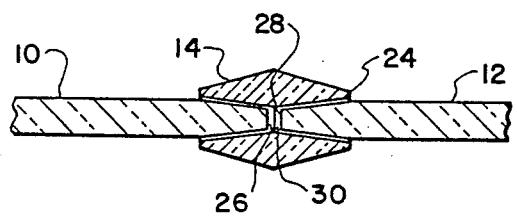
Fig. 3
PRIOR ART
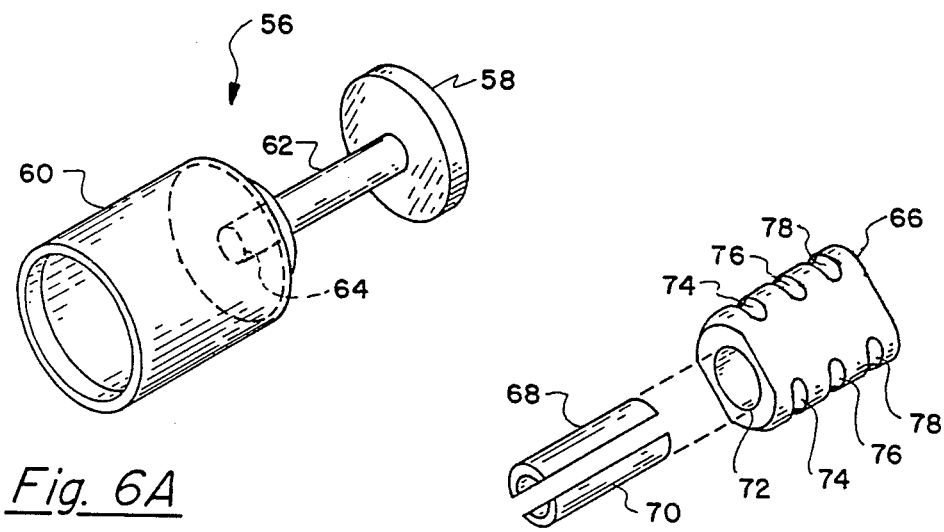
Fig. 6A
Fig. 6B

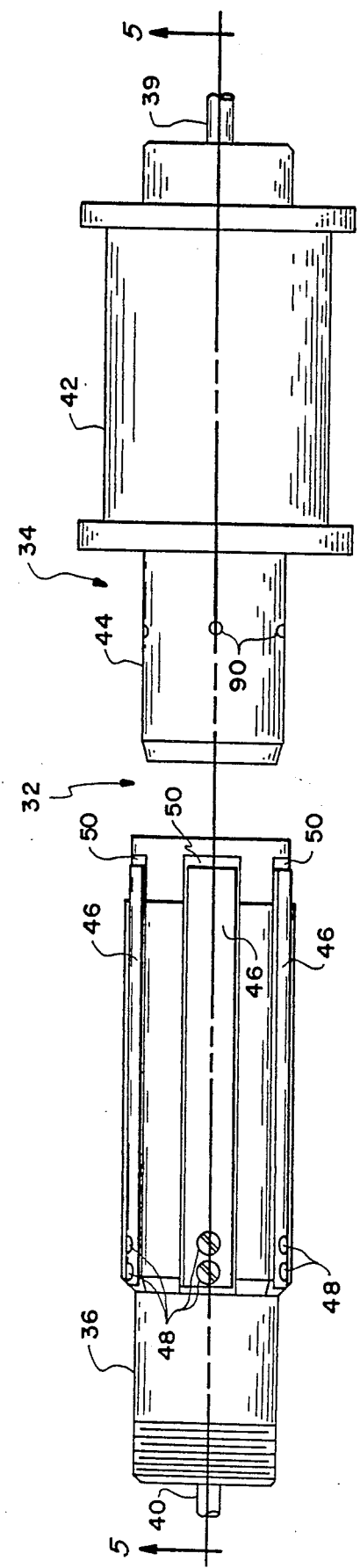

OPTICAL FIBER CONNECTOR FOR HIGH PRESSURE ENVIRONMENTS

FIELD OF THE INVENTION

This invention relates to devices for holding two optical fibers in optical alignment in high pressure environments.

RELATED ART

As shown in FIGS. 1, 2 and 3, optical fibers 10 and 12 have been aligned in surface environments by using a "biconical connector" 14. Biconical connector 14 two tapered openings or ports 16 and 18 for receiving fibers. Each opening 16 and 18 proceeds from a larger diameter 20 to a smaller diameter at the interface 22 of the tapered openings. The dimensions of the tapered openings are such that the opposed flat ends 26 and 28 (see FIG. 3) of the fibers are separated by a small distance (the distance is exaggerated in FIG. 3 for purposes of illustration, and is typically less than 0.1 microns for fibers 125 microns in diameter). Keeping the ends of the fiber separated prevents the fibers from pressing against one another and damaging their ends.

The fibers themselves are typically 100 to 150 microns in diameter. The structure shown as items 10 and 12 in FIGS. 1 through 3 are actually much larger in diameter than the fibers and include cables which house the fibers with the fibers disposed along the longitudinal axes of the cables.

In order to minimize the attenuation of optical signals propogating along the fibers, it is important to align the optical axes, (not shown) of the fibers. The optical axis of a fiber, in practice, is not at the geometric center of the fiber due to imprefections. Optical index matched fluid 30 is often placed in the space between the fiber ends 26 and 28 to suppress reflections of the signal from the ends of the fibers.

High pressure environments, such as deep undersea, substantially complicate the alignment problem. The large pressures may force the fibers together damaging the fiber ends or displace the fibers laterally. In either case, the signal transferred between the fibers will be greatly attenuated. Water may be forced into the connector by the increased pressure, bringing contaminants with it. Even a minute particle located between the fiber ends 26 and 28 can dramatically increase signal attenuation. Further, seals employed to keep water out of the connector, and the connector itself, may deteriorate rapidly in sea water. Finally, since the connector may be located deep beneath the sea surface, it is desirable to have a connector which can be readily manipulated by a robot. More specifically, the connector should be securable or detachable by a few, uncomplicated motions, and without the need to overcome large coupling forces.

Heretofore, no fiber optic connector has been known which can be easily assembled or disassembled and overcomes the problems attendant a high pressure or deep sea environment.

SUMMARY OF THE INVENTION

The present invention is a pressure compensated optical fiber connector for aligning two optical fibers. The invention includes a housing, an aperture in the housing, means for sealing the aperture about an optical fiber where the seal is biased closed but conforms to the  e of the inserted optical fiber, means for compensating the housing for the external pressure and means for holding the optical fibers in substantial optical alignment.

In the preferred embodiment, a substantially incompressible fluid having an index of refraction which is substantially the same as that of the core of the optical fiber, fills the interior of the housing. Further, the ends of the optical fibers are spaced a small distance to avoid the ends damaging one another. This small space is also filled with the index matched fluid.

Because the present invention is particularly suited for use underwater, it is accurately described as a wet mateable fiber optic connector.

BRIEF DESCRIPTION OF THE DRAWINGS

FIG. 1 is a schematic of a prior art bichonical fiber optic connector employed at one atmosphere.

FIG. 2 is a sectional view of FIG. 1 taken along line 2—2.

FIG. 3 is a sectional view of FIG. 1 taken along line 3—3.

FIG. 4 is a schematic of the connector of the preferred embodiment of the present invention when separated into its two primary components.

FIG. 6A is a perspective view of a conformable seal of the present invention.

FIG. 6B is a perspective view of some components of the seal of FIG. 6A.

DESCRIPTION OF THE PREFERRED EMBODIMENT

Figure 5A:
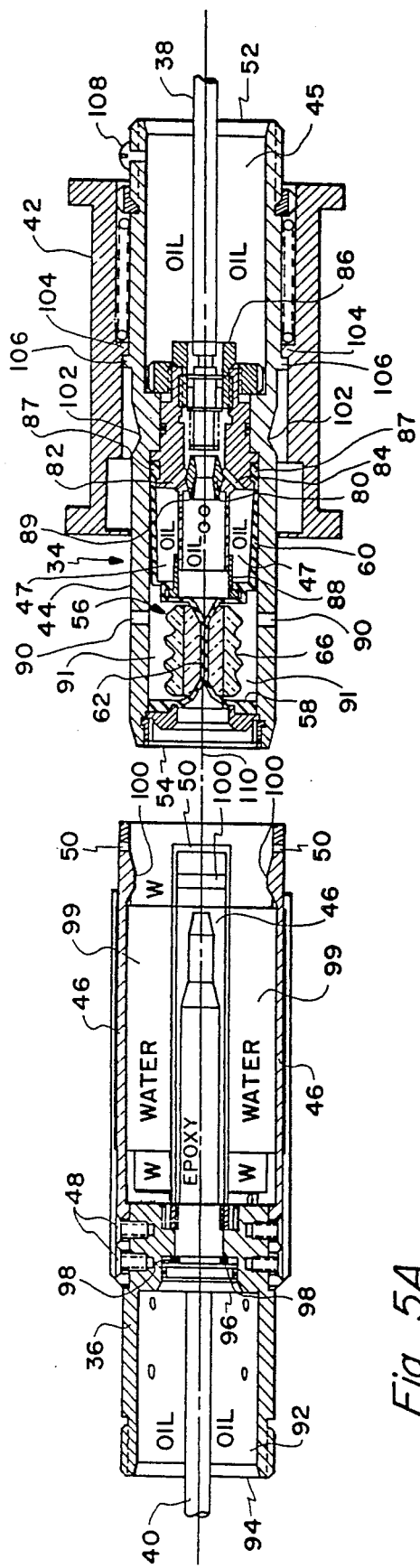
FIG. 5A is a sectional view of FIG. 4 along line 5—5.

The preferred embodiment of the present invention is shown in FIGS. 4, 5, and 6. In FIG. 4, optical fiber connector 32 includes two primary components 34 and 36 for connecting optical fibers 38 and 40. Component 34 is a housing. Housing 34 is impermeable to water and holds fiber 38. Component 36 is a carriage for holding fiber 40, it is open to the environment. Housing 34 includes a collar 42 which slips over a tubular member 44. Collar 42 is flanged at the ends and is provided primarily as a convenient means for engaging housing 34. Carriage 36 conveniently includes a plurality of flexible slats 46 which are secured at one end by screws 48. As will be described in more detail below, as tubular member 44 slides into carriage 36 the free ends of slats 46 flex outward to accommodate tubular member 44, and slide over the surface of tubular member 44 to couple components 34 and 36. Slats 46 are each positioned within one of grooves 50 formed in the sidewall of carriage 36.

The cross-sectional view of FIG. 5A show housing 34 and carriage 36 separated. Housing 34 includes apertures 52 and 54. Aperture 52 can be sealed by various means. For example an additional member (not shown for simplicity) can fit over or into aperture 54, and be sealed with a polyester resin both where this additional member would meet tubular member 44 and also tightly about optical fiber 38.

Aperture 54 is the aperture which will receive the other fiber, fiber 40. Aperture 54 must be sealed to the environment when housing 34 and carriage 36 are separated but also must allow fiber 40 to be inserted into tubular member 44 without venting the interior portions 45 and 47 of tubular member 44. If interior portions 45 and 47 are exposed to the environment, they could be contaminated with particulate matter.

In order to accomplish these tasks, aperture 54 is preferably sealed by a conformable seal or diaphram 56. FIG. 6A shows the primary components of seal 56. Seal 56 includes a circular cap 58, a flexible sheath 60 and a tube 62. Tube 62 opens into one end of sheath 60 at opening 64 and also opens at the center of cap 58.

FIG. 6B shows an additional component of seal 56, a deformable sleeve 66 which encircles tube 62. Further, half-moon shaped wedges 68 and 70 are inserted in hole 72 in sleeve 66. Sleeve 66 includes three pairs of oppositely disposed notches 74, 76 and 78 which seat three elastomeric rings (not shown). When sleeve 66, with wedges 68 and 70 inserted and the elastomeric rings in place, is positioned around tube 62, tube 62 is pressed tightly closed. Seal 56 is shown assembled in FIG. 5A with tube 62 biased or pressed closed. Neoprene is a suitable material for all components of seal 56. Sheath 60 and tube 62 should preferably be less stiff than the other components of seal 56.

In the interior of housing 34 i.e., the interior of tubular member 44, a bichonical connector 80 (which is similar to bichonical connector 14 of FIG. 1) is centrally positioned with the end of fiber 38 inserted. A suitable bichonical connector 80 can be constructed of a mixture of approximately 30% epoxy and 70% fused quartz. Dorran corporation of Atlantic Highlands, N.J. makes such a connector. The interior portions 45 and 47 of tubular member 44 are also filled with a substantially incompressible fluid having an index of refraction which is substantially the same as that of the core of optical fibers 38 and 40. Typically such fluid is a silicone based oil. Examples of such oils are Dow Corning oil 200 with a viscosity of 1000 cts, or Cargville laser liquid. The optical index of refraction of these fluids is approximately 1.5 and their compressibility is less than 1% even at the greatest depths of the oceans.

Interior portions 45 and 47 of housing 34 are in communication so that no pressure differential will appear between them. This is facilitated by holes 82 and 84 provided in collar 86 (collar 86 being employed to hold biconical connector 80 and optical fiber 38). Interior portion 47 in tubular member 44 is actually formed by one end of sheath 60 sealing collar 86 and the interior surface of tubular member 44 at groove 87. Conveniently a guide tube 88 is positioned centrally within sheath 60 to receive optical fiber 40. To insure that uniform pressure exists between the ends of optical fibers 38 and 40 when coupling has been completed, a very thin capillary 89 is provided through the sidewall of biconical connector 80 to insure that the hydrostatic pressure within the small gap between the ends of cable 38 and 40 is equal to the hydrostatic pressure within the interior portions 45 and 47 of housing 34. If the pressure between the ends of fibers 38 and 40 were not equalized with the interior portions 45 and 47 of housing 34, the ends of fiber 38 and 44 could be driven together and damaged or excessive force could be required to separate housing 34 and carriage 36. Holes 90 in the sidewall of tubular member 44 allow sea water to flow into cavity 91 and surround sleeve 66.

Carriage 36 includes an interior cavity 92 which is also conveniently pressure compensated by being filled with an incompressible fluid. Cavity 92 is typically sealed with a further additional member (not shown for simplicity) which fits over end 94 of carriage 36. Cable 40 is inserted through and held by wall 96 of cavity 92. Wall 96 is sealed with a flexible seal 98 shown in cross-section in FIG. 5A.

Cable 40 extends a substantial distance into the open portion 99 of carriage 36. This extended length of cable 40 allows sufficient movement or "play" in the end of cable 40 so that cable 40 can be worked through tube 62 and seal 56 without undue stress on cable 40 or seal 98.

The inside surface of slats 46 include a key 100 near their free ends. These keys 100 are shaped to mate with groove 102 on the exterior of tubular member 44. Note that a flange 104 on the interior surface of collar 42 engages a flange 106 on the exterior of tubular member 44 to limit the forward position of collar 42 relative to tubular member 44. The additional member (not shown) which caps aperture 52 can thread onto tubular member 44 and fix the rear position of collar 42.

Figure 5B:
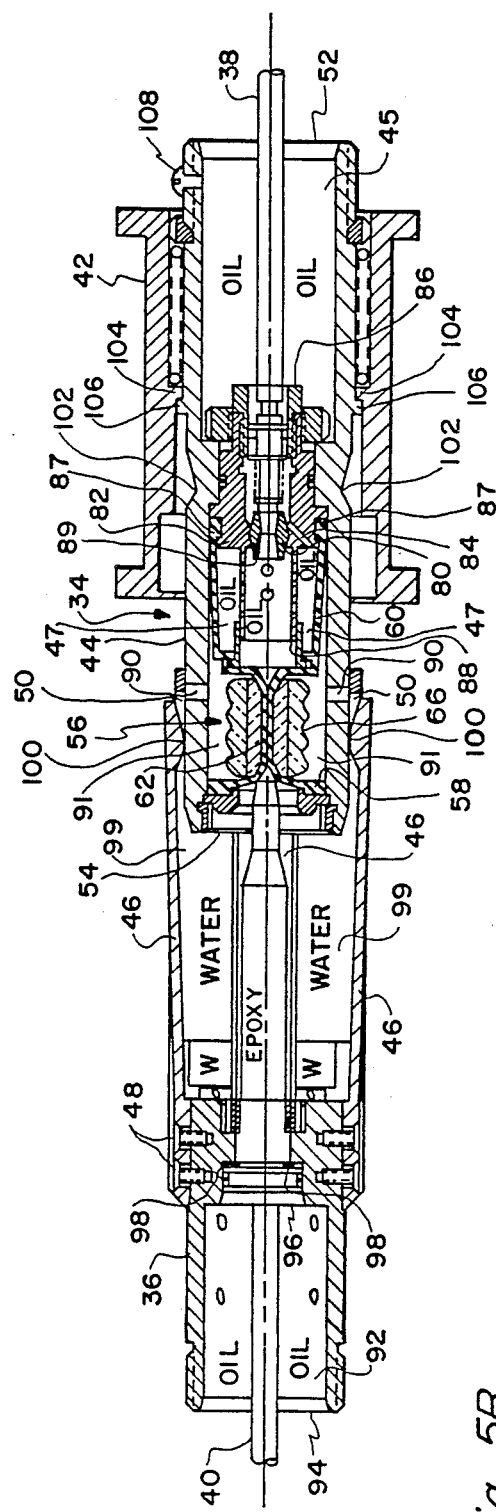
FIGS. 5B, 5C and 5D are the same sectional view as shown in FIG. 5A of the two primary components of the preferred embodiment, but they depict a sequence of steps as the two primary components are brought together to complete the connection.
Figure 5C:
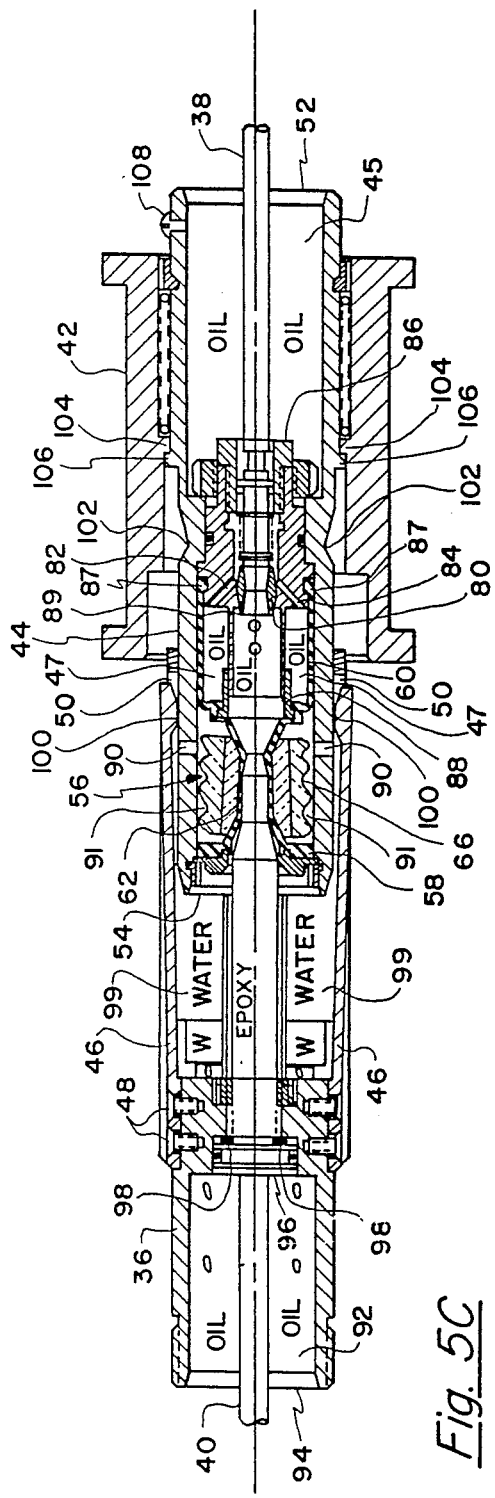
Figure 5D:
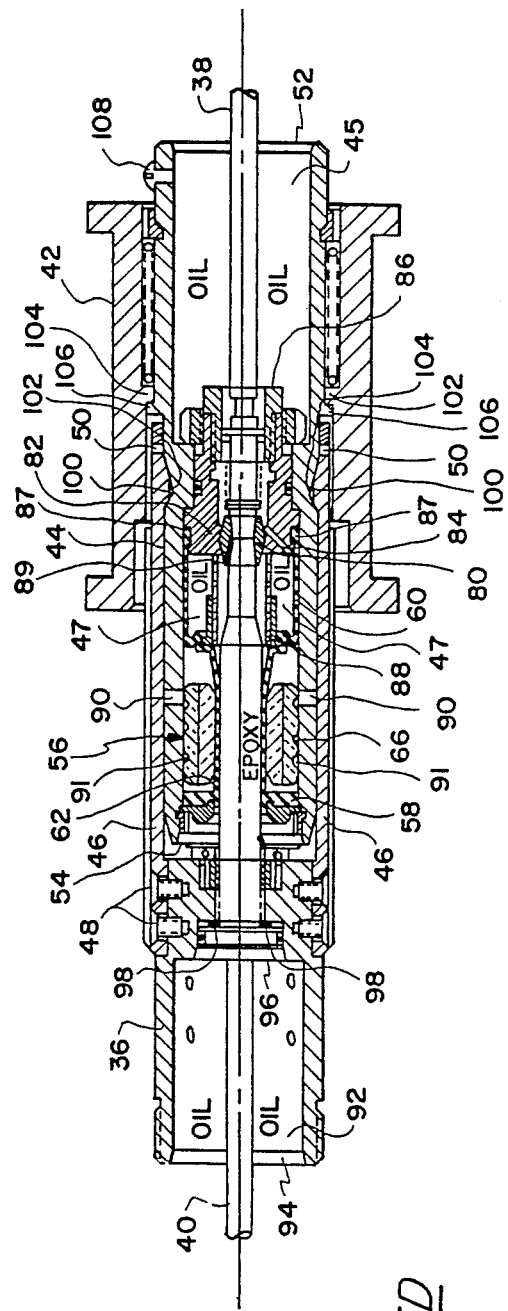

In operation, fibers 38 and 40 are connected by positioning housing 34 and carriage 36 as shown in FIG. 5A, then moving housing 34 and carriage 36 towards one another in the sequence of steps depicted in FIGS. 5B, 5C and 5D.

In FIG. 5B, housing 34 and carriage 36 have been brought to the point where the end of cable 40 has just made contact with cap 58 of seal 56. It is assumed that the entire connector 32 is immersed in water, thus water has filled cavity 91 in tubular member 44 as well as the forward portion 99 of carriage 36 as shown. In FIG. 5B, the free ends of slats 46 engage the exterior of tubular member 44 at keys 100. Tubular member 44 is sized to just fit between the free ends of slats 46 and as housing 34 and carriage 36 are brought together, the free ends of slats 46 flex outwardly but remain in contact with annular member 44. In FIG. 5B, interior portions 45 and 47 of annular member 44 are at the same hydrostatic pressure as the surrounding environment.

In FIG. 5C, the end of fiber 40 has now been pressed all the way through tube 62 of seal 56. Since the hydrostatic pressure in interior portions 45 and 47 of annular member 44 was equal to the exterior pressure prior to the insertion of the end of fiber 40, and since the index matched fluid in interior portions 45 and 47 is substantially incompressible, as the end of fiber 40 is pressed into the index matched fluid, there will be a momentary slight increase in hydrostatic pressure in interior portions 45 and 47 and this small increased differential pressure will force a small amount of the index matched fluid out of interior portion 47 by way of tube 62.

Thus, connector 32 will keep sea water and attendant contaminants out of the interior portions 45 and 47 of tubular member 44 by purging a small amount of index matched fluid each time coupling occurs. Eventually, the fluid in interior portion 47 of tubular member 44 will be depleted by repeated coupling, therefore it is preferable to include a seal screw 108 in tubular member 44 for refilling interior portions 45 and 47 of tubular member 44 with index matched fluid at selected times. Typically the volumn of interior portion 47 will be on the order of 20 cubic centimeters. It is estimated that typically one tenth of a cubic centimeter will be lost for each coupling.

Further, as fluid is expelled from interior portions 45 and 47 of tubular member 44, the external pressure of the sea water will push or roll flexible sheath 60 towards bichonical connector 80. A careful comparison of FIGS. 5C and 5D will reveal that sheath 60 has rolled slightly towards bichonical connector 80 in FIG. 5D relative to the position of sheath 60 in FIG. 5C.

Since the interior tubular member 44 surrounding sleeve 66 is vented to the sea by way of holes 90, as fiber 40 is inserted through tube 62, sleeve 60 will be stretched and pushed radially outward towards the sidewall of tubular member 44 thereby pressing water out through holes 90.

FIG. 5D shows the final position for complete coupling. Keys 100 have now been inserted into groove 102 and the ends of fibers 40 and 38 are aligned (of course a small gap is provided between the ends). Virtually all water has been pressed from cavity 91 due to the volumn of cable 40. The volumn of cavity 91 should be selected to be slightly larger than the volumn of that part of cable 40 which will be inserted into tubular member 44 as shown in FIG. 5D. The entire coupling procedure involves simply approximately aligning aperture 54 with the opened end of carriage 36 and sliding the two components 34 and 36 together until keys 100 seat in groove 102. Preferably, the mating ends of components 34 and 36 are radially symmetric so that no rotational alignment is required. Groove 102 preferably circumscribes the entire perimeter of tubular member 44 so that keys 100 will seat within groove 102 irrespective of the relative angular position of components 34 and 36 about central axis 110. It is preferable to employ optical fibers with the present invention having a level of signal loss which is substantially invariant under rotation about their optical axes.

The present invention is not, of course, limited to the preferred embodiment. For example fiber connectors other than a bichonical connector can be employed in the invention. The only requirement for the connector is that it hold the optical axes of the fibers in substantial alignment, with the ends of the fibers preferably separated by a small distance. A gas could be used instead of a fluid for pressure compensation and other conformable seals, which are biased closed when no fiber is inserted, could be used in aperture 54 in place of seal 56. Although the fluid has been described as substantially incompressible it should be realized that the fluid need not be strictly incompressible. A particular advantage in the present invention is the low cost, durability and attendant minimal maintenance requirements of seal 56. Seal 56 is highly resistive to deterioration due to exposure to sea water. Also, it is preferable that tubular member 44, collar 42 and carriage 36 be made of titanium since titanium is extremely resistive to corrosion or other deterioration due to exposure to sea water.

What is claimed is:

1. An optical fiber connector for connecting first and second optical fibers in a high pressure environment, wherein each of said fibers has an end to be connected and an optical axis, said connector comprising:
    a housing impermeable to water, said housing having an interior;
    first aperture in said housing, said first aperture being sized to allow said first optical fiber to extend into said interior of said housing;
    second aperture in said housing, said second aperture being sized to allow said second optical fiber to extend into said interior of said housing;
    first means for sealing said first aperture against water when said first optical fiber is extended into said interior of said housing through said first aperture;
    second means for sealing said second aperture against water when said second optical fiber is extended into said interior of said housing through said second aperture, wherein said second sealing means is biased closed when said second optical fiber is not inserted into said second sealing means, and wherein said second sealing means is deformable and will conform to the surface of said second optical fiber as said second optical fiber is inserted through said second aperture;
    means for holding said end of said first optical fiber and said end of said second optical fiber so that said optical axes are in substantial alignment, said holding means being disposed in said interior of said housing; and
    means for substantially compensating said interior of said housing for the pressure on the exterior of said housing and on the exterior of said seals.

2. The connector of claim 1 wherein said optical fibers each have an index of refraction and further including a substantially incompressible fluid having an index of refraction, wherein said fluid fills said interior of said housing and said index of refraction of said fluid and of said fibers are substantially the same.

3. The connector of claim 1 wherein said ends of said optical fibers are spaced a small distance apart relative to the diameter of said fibers, when said fibers are connected.

4. The connector of claim 1 wherein said holding means comprises a dual port member wherein each port is tapered from a larger diameter to a smaller diameter and said ports meet at a common interface.

5. The connector of claim 4 wherein a capillary is provided in said dual port member so that said common interface is connected to said interior of said housing by way of said capillary.

6. The connector of claim 1 wherein said second seal is comprised of neoprene.

7. The connector of claim 1 wherein said second seal includes a tube, means for biasing said tube closed, and a sheath member wherein said tube leads from said second aperture to said sheath member and said sheath member seals said interior of said housing at said second aperture.

8. The connector of claim 1 further including carriage means for supporting said second fiber, said carriage means including a plurality of flexible members, said flexible members being adapted to slide over the exterior of said housing and seat within a groove in said exterior of said housing, to thereby connect said first and second fibers.

9. An optical fiber connector for connecting first and second optical fibers in a high pressure environment, wherein each of said fibers has an end to be connected and an optical axis, said connector comprising:
    a housing impermeable to water, said housing having an interior;
    first aperture in said housing, said first aperture being sized to allow said first optical fiber to extend into said interior of said housing;
    second aperture in said housing, said second aperture being sized to allow said second optical fiber to extend into said interior of said housing;
    first means for sealing said first aperture against water when said first optical fiber is extended into 'said interior of said housing through said first aperture;
    second means for sealing said second aperture against water when said second optical fiber is extended into said interior of said housing through said second aperture, wherein said second sealing means is biased closed when said second optical fiber is not inserted into said second sealing means, and wherein said second sealing means is deformable and will conform to the surface of said second optical fiber as said second optical fiber is inserted through said second aperture;

means for holding said end of said first optical fiber and said end of said second optical fiber so that said optical axes are in substantial alignment, said holding means being disposed in said interior of said housing; and means for balancing the hydrostatic pressure within said interior of said housing with the hydrostatic pressure on the exterior of said housing and on the exterior of said seals, so that there is substantially no pressure differential across surfaces of said housing and across said seals.

10. An optical fiber connector for connecting first and second optical fibers, wherein each of said fibers has an end to be connected and an optical axis, said connector, comprising:

a first portion which supports said first fiber;

a second portion which supports said second fiber, said second portion including a plurality of flexible members being adapted to slide over the exterior of said first portion and seat within corresponding depressions or apertures in the exterior of said first portion, so that said first and second portions are coupled and said ends of said fibers are positioned to substantially align said optical axes.

* * * * *